(12) United States Patent
Schwarzmann et al.

(10) Patent No.: US 11,585,258 B2
(45) Date of Patent: Feb. 21, 2023

(54) METHOD FOR DETERMINING THE LOADING OF A SOOT FILTER

(71) Applicants: VOLKSWAGEN AKTIENGESELLSCHAFT, Wolfsburg (DE); ROBERT BOSCH GMBH, Stuttgart (DE)

(72) Inventors: Dieter Schwarzmann, Stuttgart (DE); Thomas Binnewies, Nienhagen (DE); Thomas Kessler, Leiferde (DE); Florian Brunner, Magstadt (DE)

(73) Assignees: VOLKSWAGEN AKTIENGESELLSCHAFT, Wolfsburg (DE); ROBERT BOSCH GmbH, Stuttgart (DE)

( * ) Notice: Subject to any disclaimer, the term of this patent is extended or adjusted under 35 U.S.C. 154(b) by 586 days.

(21) Appl. No.: 16/654,458

(22) Filed: Oct. 16, 2019

(65) Prior Publication Data
US 2020/0123958 A1  Apr. 23, 2020

(30) Foreign Application Priority Data
Oct. 17, 2018  (DE) ...................... 10 2018 125 730.9

(51) Int. Cl.
*F01N 11/00* (2006.01)
*G01F 1/66* (2022.01)
(Continued)

(52) U.S. Cl.
CPC ............. *F01N 11/002* (2013.01); *G01F 1/66* (2013.01); *G01K 13/02* (2013.01); *G01L 13/00* (2013.01);
(Continued)

(58) Field of Classification Search
CPC combination set(s) only.
See application file for complete search history.

(56) References Cited

U.S. PATENT DOCUMENTS 6,941,750 B2 *  9/2005  Boretto ................. F01N 11/002
                                                 60/297
8,646,257 B2 *  2/2014  Svensson ................ F01N 11/00
                                                 60/297
(Continued)

FOREIGN PATENT DOCUMENTS

CN      103221654 A    7/2013
CN      206386174 U    8/2017
(Continued)

OTHER PUBLICATIONS

Extended search report for European Patent Application No. EP 19 20 2886.6, dated Jan. 13, 2020.
(Continued)

*Primary Examiner* — Nguyen Q. Ha
(74) *Attorney, Agent, or Firm* — Pearl Cohen Zedek Latzer Baratz LLP

(57) ABSTRACT

The invention relates to a method for determining a loading of a soot filter with soot particles from an exhaust gas mass flow of an internal combustion engine in a motor vehicle, a control device for an internal combustion engine having a soot filter, and a computer program product for carrying out the method. In the first step 100 of the method a characteristic curve for the relationship between the exhaust gas mass flow, exhaust gas temperature, ambient pressure, and pressure drop across the soot filter without loading is determined; in the second step 200 a second exhaust gas mass flow and a second pressure drop that occurs during loading of the soot filter are determined; in the third step 300, from the characteristic curve the first pressure drop is determined for which the first and second exhaust gas mass flows have the same value; in the fourth step 400 an estimated value for the loading of the soot filter is computed via a real-time parameter estimation, preferably by use of the gradient method, based on the previously determined parameters.

(Continued)

The method allows a reliable determination of the instantaneous loading of a particulate filter, regardless of the type of measuring signals used in each case for characterizing the loading behavior of the soot filter.

11 Claims, 2 Drawing Sheets

(51) Int. Cl.
  *G01K 13/02* (2021.01)
  *G01L 13/00* (2006.01)
  *G01N 15/08* (2006.01)
  *G01K 13/024* (2021.01)

(52) U.S. Cl.
  CPC ....... *G01N 15/0806* (2013.01); *G01K 13/024* (2021.01); *G01N 2015/084* (2013.01)

(56) References Cited

U.S. PATENT DOCUMENTS

| | | | |
|---|---|---|---|
| 2005/0016137 A1 | | 1/2005 | Hamahata et al. |
| 2005/0188686 A1* | | 9/2005 | Saito ............... F01N 13/008 60/297 |
| 2010/0132339 A1* | | 6/2010 | Barkhage ......... F01N 3/0235 60/287 |
| 2015/0088399 A1 | | 3/2015 | Sun et al. |
| 2018/0202342 A1 | | 7/2018 | Pannuzzo et al. |

FOREIGN PATENT DOCUMENTS

| | | | |
|---|---|---|---|
| CN | 108331646 A | | 7/2018 |
| DE | 199 33 988 A1 | | 1/2000 |
| DE | 10 2014 113 474 A1 | | 3/2015 |
| DE | 10 2014 201 589 B3 | | 5/2015 |
| DE | 10 2015 014 931 A1 | | 5/2017 |
| EP | 1 854 971 A1 | | 11/2007 |
| EP | 1936139 B1 * | 7/2009 | ............ F01N 11/002 |
| EP | 2 261 474 A1 | | 12/2010 |
| FR | 2 965 013 A1 | | 3/2012 |
| WO | WO 92/06284 A1 | | 4/1992 |
| WO | WO 2008/079299 A2 | | 7/2008 |

OTHER PUBLICATIONS

Office Action for Chinese Patent Application No. 201910987289.3, dated May 8, 2021.

Search report for German Patent Application No. 10 2018 125 730.9, dated Sep. 25, 2019.

Diesing, H.; Tischer, W.: Anwendung von Parameterschätzverfahren zur Identifikation mechanischer Schwingungssysteme. In: Technische Mechanik, Bd. 3, 1982, H. 4, S. 62-69.—ISSN 0232-3869 (P); 2199-9244 (E). URL: http://www.ovgu.de/ifme/zeitschrift_tm/1982_Heft4/Diessing_Tischer. pdf [abgerufen am Feb. 14, 2019].

Ioannou, Petros; Fidan, Bans: Adaptive control tutorial. Philadelphia: Society for Industrial and Applied Mathematics, 2006 (Advances in design and control)—cover page and table of contents. ISBN 978-0-89871-615-3. URL: http://www.gbv.de/dms/llmenau/toc/518029921.PDF [abgerufen am Feb. 14, 2019].

Vogt, Michael: Weiterentwicklung von Verfahren zur Online—Parameterschätzung und Untersuchung von Methoden zur Erzeugung zeitlicher Ableitungen. Darmstadt, 1998. S. 1-80.—Darmstadt, Techn. Univ., Dipl.-Arb., 1998. URL: https://www.rtm.tudarmstadt.de/media/rtm__rtp_mitarbeiterktp_mitarbeiter_ehemaligektp_mitarbeiter_ehemalige_vogt michael/docs_vogt_michael/vogt_1998_diplom. pdf [abgerufen am Feb. 14, 2019].

* cited by examiner

METHOD FOR DETERMINING THE LOADING OF A SOOT FILTER

CROSS-REFERENCE TO RELATED APPLICATIONS

This application claims priority from German Patent Application No. 10 2018 125 730.9, filed Oct. 17, 2018, which is hereby incorporated by reference.

FIELD OF THE INVENTION

The invention relates to a method for determining the loading of a soot filter with soot particles from an exhaust gas mass flow of an internal combustion engine in a motor vehicle. The invention further relates to a control device for an internal combustion engine, and a computer program product for carrying out such a method.

BACKGROUND OF THE INVENTION

In the course of efforts to improve air quality, all industrialized countries have enacted standards in the form of limit or target values, in particular also particulate limits, for the emission of pollutants. In view of the increasing volume of traffic worldwide, exhaust aftertreatment for the motor vehicles, which are operated predominantly with internal combustion engines, is therefore of great importance. The soot particles which result during operation of diesel engines and recent gasoline engines with direct injection are therefore retained and collected in soot filters or particulate filters. For this purpose, the soot filters used are equipped with porous inner walls made of ceramic, for example, through which the exhaust gas flow is led, and the soot particles deposit on or in the porous walls. The deposition of the particles on or in the porous inner walls increases the flow resistance of the filter, and thus, the differential pressure across the soot filter produced by the exhaust gas volumetric flow, which in turn results in higher fuel consumption. To prevent plugging of the filter, the deposited soot particle layer is removed when a predefined loading limit of the soot filter is reached. Since soot particles are composed primarily of combustible components, this regeneration operation takes place by combusting the soot deposits in the soot filter at approximately 600° C., with conversion to carbon dioxide.

The loading of the soot filter is generally determined by measuring the differential pressure across the soot filter and monitoring by the engine control unit, which triggers a regeneration of the soot filter when a predefined loading limit is reached and controls same, taking into account the additional dependency of the differential pressure on the engine load and engine speed. The time when a soot filter in a motor vehicle requires regeneration thus depends on the specific type of driving behavior. Thus, the loading of a soot filter with soot particles is significantly lower in a motor vehicle during extended expressway driving, while it is higher in city traffic. If a regeneration of the soot filter is triggered too late or does not take place at all, the soot filter may become clogged, resulting in undesirably high exhaust back pressure, which entails undesirably high additional fuel consumption until the engine is stopped. If burnoff takes place too early, the soot particulate filter is damaged due to the excessively high temperature. Reliable recognition of the loading of a soot filter in a motor vehicle is therefore an important safety feature which additionally contributes to lower fuel consumption, and thus as a whole increases the contribution of a particulate filter to air quality.

Various methods for recognizing loading in particulate filters in motor vehicles are known from the prior art, in which a differential pressure across the filter is measured.

Cited as an example is published unexamined German Patent Application DE 199 33 988 A1, in which a determination of a loading c of a particulate filter, based on the differential pressure ΔP between the inlet and the outlet of the filter, and a quantity of gas A flowing through the particulate filter as a function of the quantity of fresh air $M_{air}$ and the quantity of fuel $M_c$ supplied to the engine, is given by the following formula:

$$\Delta P = c \cdot A + b = c \cdot \left( (M_{air} + M_c) \cdot \frac{T}{P} \cdot N \right) + b$$

where b: constant, T: temperature of the exhaust gas upstream from the filter, P: pressure of the exhaust gas upstream from the filter, N: engine speed.

The loading is hereby regarded as a proportionality factor in an equation, wherein a deviation in the differential pressure sensor used is computed, based on at least two separate measuring points. The determination of the loading may take place over a fairly large number of measuring points, for example by linear regression. The properties (parameters) of a linear function (slope, offset) may be estimated in a known manner by means of linear regression.

Thus, although the indicated loading model allows sensor-related deviations or a sensor offset to be taken into account, a linear dependency on the pressure difference and the volumetric flow is assumed. This means that in order to determine the loading, the exhaust gas volumetric flow must be known; i.e., solely a relationship between loading and the exhaust gas volumetric flow is taken into account, and the determination cannot be based on arbitrary relationships or characteristic curves.

Further loading models based on a differential pressure measurement are disclosed in DE 10 2014 201 589 B3, EP 1 854 971 A1, EP 2 261 474 A1, WO 92/06284 A1, and WO 2008/09299 A2.

With the present invention, the aim is to provide a method that is suitable for overcoming the disadvantages of the prior art, and that allows a reliable determination of the instantaneous degree of loading of a soot filter with soot particles from an exhaust gas mass flow of an internal combustion engine in a motor vehicle, in particular regardless of the type of measuring signals used in each case for characterizing the loading behavior of the soot filter.

SUMMARY OF THE INVENTION

The object according to the invention is achieved by the subject matter of the independent patent claims. Preferred refinements are the subject matter of the subclaims.

A first aspect of the present invention relates to a method for determining a loading of a soot filter with soot particles from an exhaust gas mass flow of an internal combustion engine, in particular a gasoline engine, in a motor vehicle, having the method steps described below.

The terms internal combustion engine, gasoline engine, exhaust gas mass flow, pressure drop across the soot filter, and real-time parameter estimation are used according to the following definitions. Internal combustion engines refer in general to combustion engines that are operated by combusting a fuel-air mixture. In motor vehicles, these are primarily gasoline engines operated with gasoline, and diesel engines operated with diesel fuel. The following relationship applies for an exhaust gas mass flow; $\dot{m}=\rho \cdot C \cdot A=\rho \cdot \dot{V}$, where $\rho$: density of the exhaust gas, C: average flow velocity, A: cross-sectional area, and $\dot{V}$: volumetric flow. The pressure drop across the soot filter generally refers to a difference of a gas pressure between the inlet and the outlet of the soot filter during operation ($\Delta=p_{in}-p_{out}$). A real-time parameter estimation, or also online parameter estimation, is a method for estimating parameters of a process model in real time, i.e., during a process sequence. The model of the actual process during operation is also computed. Based on deviations between modeled measured values and actual (measured) measured values, the parameters of the process model are adapted in such a way that the same output behavior results. Since the measured values used in the real-time parameter estimation occur in a temporal sequence, the real-time parameter estimation is a time-recursive method (see M. Vogt: Weiterentwicklung von Verfahren zur Online-Parameterschätzung and Untersuchung von Methoden zur Erzeugung zeitlicher Ableitungen [Refinement of methods for online parameter estimation and investigation of methods for generating time derivatives], T U Darmstadt, 1998). In particular, the real-time parameter estimation involves the creation of a model that is described by an equation system having a number of parameters to be determined. The equation system is used to determine the model parameters, based on a measured input-output behavior of the actual system. The known parameter estimation methods include the gradient method and the least squares method (see H. Diesing, W. Tischer: Anwendung von Parameterschätzverfahren zur Identifikation mechanischer Schwingungssysteme [Use of parameter estimation methods for identifying mechanical oscillation systems], Berlin).

A characteristic curve for the relationship between the exhaust gas mass flow and the pressure drop across the soot filter without loading is determined in a first method step. For this purpose, a plurality of different first exhaust gas mass flows of an internal combustion engine are led through a soot filter without loading, i.e., an empty soot filter. The first exhaust gas mass flow is preferably increased in stages in such a way that the overall flow range, within which the exhaust gas mass flow through a soot filter in question may fluctuate during actual driving operation, is covered in the characterization of the empty soot filter. The exhaust gas temperature and the ambient pressure are also varied in order to also take into account their effect on the exhaust gas mass flow or the pressure drop across the soot filter. A pressure drop that is measured at a certain exhaust gas temperature and a certain ambient pressure may also be adapted by computer to other exhaust gas temperatures and/or ambient pressures, based on the known thermodynamic relationships. For each first exhaust gas mass flow, an associated first pressure drop $y_{empty}$ that occurs is measured, using at least one suitable sensor. For this purpose, a differential pressure sensor is preferably used that measures the pressure drop between the inlet and the outlet of the soot filter. Alternatively, two pressure sensors may be used, a first pressure sensor being situated at the input or inlet of the soot filter, and a second pressure sensor being situated at its output or outlet. An improvement in the measuring accuracy compared to measuring with a differential pressure sensor between the inlet and the outlet of the soot filter may be achieved with this type of pressure measurement.

With the values for the first pressure drops $y_{empty}$ that are obtained by measuring the differential pressure across the soot filter, i.e., the difference of the exhaust gas pressures between the inlet and the outlet of the soot filter, a characteristic curve of the soot filter, without loading, that is normalized with respect to the exhaust gas temperature and the ambient pressure, is determined and provided for use in the subsequent method steps. An adaptation, possibly required in the further course of the method, of a first pressure drop value $y_{empty}$ given in the characteristic curve to a second pressure drop value $y_{meas}$ measured during the loading while in driving operation, with regard to the exhaust gas temperature and the ambient pressure takes place by computer, based on the known thermodynamic relationships.

Based on this characteristic curve, in the further method steps the instantaneous loading of the soot filter is determined, taking into account the instantaneous measured values in each case for the pressure drop $y_{meas}$ across the soot filter, the exhaust gas temperature, and the ambient pressure. In the following discussion it is assumed that each measured pressure drop is corrected with regard to the exhaust gas temperature and the ambient pressure for use in the loading determination according to the invention.

In a second method step, a second exhaust gas mass flow of the internal combustion engine, which is led through the soot filter with loading, is determined, and a second pressure drop $y_{meas}$ that hereby occurs is determined in the above-mentioned manner, taking into account the measured exhaust gas temperature and the measured ambient pressure. The value or value pair obtained in this method step for the second exhaust gas mass flow thus essentially characterizes an instantaneous flow resistance of the soot filter.

In a third method step, from the characteristic curve determined for the empty soot filter in the first method step, the first pressure drop $y_{empty}$ is selected for which the first and the second exhaust gas mass flow have the same value. By correcting to standard values, the measurements during driving operation and for determining the characteristic curve do not have to take place at the same exhaust gas temperature and the same ambient pressure in order to be used for comparison. Since such a correction is made in all cases based on the known thermodynamic relationships, in which the measured values for the exhaust gas temperature and the ambient pressure during measurement of the first pressure drop $y_{empty}$ differ from the measured values for the exhaust gas temperature and the ambient pressure during measurement of the second pressure drop $y_{meas}$, it is ensured that the first pressure drop $y_{empty}$ and the second pressure drop $y_{meas}$ are determined for the exhaust gas mass flow and for the same values of the exhaust gas temperature and the ambient pressure, so that, based on a deviation of the instantaneous second pressure drop $y_{meas}$ from the first pressure drop $y_{empty}$ determined when the filter was empty, a conclusion may be drawn concerning a change in the loading of the soot filter that has taken place in the meantime. A change in the loading of the soot filter determined in this way thus corresponds to one that has been determined with a first and second pressure drop $y_{empty}$, $y_{meas}$ measured under the same environmental conditions.

The third method step is necessary due to the fact that the pressure drop across the soot filter is a function not only of the loading, but also of the effective exhaust gas mass flow through the filter in each case, which is provided directly from the above formula for the exhaust gas mass flow. Due to these dependencies of the pressure drop across the soot filter, either the first pressure drop $y_{empty}$, which is obtained from the characteristic curve for the empty soot filter, or the second pressure drop $y_{meas}$, which is measured during the loading of the soot filter while in driving operation, must be corrected with regard to the exhaust gas temperature and/or the ambient pressure in order to be able to reliably determine the loading of the soot filter with soot particles, based on a difference between the second pressure drop $y_{meas}$ and the first pressure drop $y_{empty}$.

The two values for the first pressure drop $y_{empty}$ and the second pressure drop $y_{meas}$ that are now present are used in a subsequent fourth method step as parameters for the reference model used, and as such characterize the measured input-output behavior of the soot particulate filter. According to the invention, the loading of a soot filter with soot particles from an exhaust gas mass flow of an internal combustion engine in a motor vehicle is determined via a real-time parameter estimation according to the process model $$y_{estimated}(\theta) = y_{empty} \cdot \theta_1 + \theta_2 = y_{empty} \cdot k + d$$

where $\theta$: estimated parameter, $\theta_1 = k$: estimated amplification due to loading of the soot filter, $\theta_2 = d$: estimated sensor deviation in determining the pressure drop across the soot filter.

Thus, in the process model used according to the invention, a second pressure drop $y_{meas}$ that is determined during loading of the soot filter while in driving operation is compared to a first pressure drop $y_{empty}$ that has been determined with the same soot filter or one having the same design, without soot particle loading, at the same exhaust gas mass flow via a prior measurement on a test stand and corrected with regard to the values for exhaust gas temperature and/or ambient pressure measured during driving operation, and taken into account as errors of a process parameter with respect to a corresponding reference parameter.

Alternatively, the loading may be determined nonlinearly across the pressure drop $y_{empty}$ if necessary. This is carried out using additional parameters, for example in the form $$y_{estimated}(\theta) \Sigma_i f_i(y_{empty}, x) \cdot \theta_i + d.$$

The functions $f_i(y_{empty}, x)$ thus represent known nonlinearities (for example, $y_{empty}^2$, $y_{empty}^3$, ...). The term x refers to additional determinable variables that may be important for a general case. The loading results from the values $\theta_i$. As stated above, in the following description a single factor is assumed, and this expansion is not further discussed.

Represented in general terms, the process model is thus given as follows:

$$\Delta p_{meas} = \text{factor} \cdot \Delta p_{empty} + \text{sensor offset}$$

where $\Delta p_{meas} = p_{2,in} - p_{2,out}$: differential pressure across the soot filter during loading, i.e., the difference of the exhaust gas pressure between the inlet and the outlet of the soot filter during loading, $\Delta p_{empty} = P_{1,in} - p_{1,out}$: differential pressure across the soot filter without loading, i.e., the difference of the exhaust gas pressure between the inlet and the outlet of the soot filter without loading. The differential pressures are considered to be normalized, i.e., converted to the same ambient conditions. The factor stands for a loading-related amplification. With the sensor offset, a systematic error is taken into account, based in particular on the measuring device used during the pressure measurement.

In contrast, the loading recognition according to the prior art is based solely on the relationship of pressure difference/volumetric flow, for which the quadratic polynomial $\Delta p_{measured} = A \cdot \dot{V}^2 + B \cdot \dot{V} + C$, where $\dot{V}$: exhaust gas volumetric flow, is used as the process model. Thus, the method according to the invention is not limited to a pressure difference/volumetric flow reference model, but instead allows the use of other reference models, for example the ratio of the exhaust gas pressure upstream from the filter to the exhaust gas pressure downstream from the filter $p_{1,upstream}/p_{1,downstream}$, for which in this case the characteristic curve is determined in the first method step, from which the reference parameters $y_{empty}$, to be used in the subsequent method steps, are obtained.

For computing the parameters of the process model, initially an error e between the second pressure drop $y_{meas}$, measured with the soot filter loaded, and the estimated value $y_{estimated}$ to be determined is computed:

$$e = y_{estimated}(\theta) - y_{meas} = (k \cdot y_{empty} + d) - y_{meas}$$

where $\theta_1 = k = 1$ for the soot filter without loading.

Lastly, using the error e, the first estimated parameter $\theta_1 = k$ and the second estimated parameter $\theta_2 = d$ are computed as parameters of the process model, using one of the known real-time parameter estimation methods. In computing the parameters $\theta$, for example the quadratic error is minimized in a known manner, wherein the following generally applies: the smaller the value of $J(\theta)$, the better the estimation ($J = \int_0^\infty e(t)^2 dt$, where $e(t) = x_{setpoint}(t) - x_{actual}(t)$).

Various other optimization functions may be used in addition to the sum of the least-square error method. One such option is represented, for example, by the instantaneous error minimization $J = e(t)^2$. Further optimization functions are also available from the literature. Depending on the particular optimization function selected, a parameter estimator is obtained that differs from the parameter estimators that are obtainable with other optimization functions. For the online capability of an optimization function, it is helpful for it to be based on linear parameters, thus requiring only minimal computing power for the computation. Numerical optimizations ((convex) nonlinear optimization, for example) are also conceivable, but are disadvantageous with regard to the required computing power. This requirement is advantageously met by the process model according to the invention.

The quality function to be minimized is given by $$J(\theta) = e^2/2.$$

Derivatizing this quality function according to the parameters gives the following:

$$J(\theta) = \left[\frac{\delta J}{\delta \theta_1}, \frac{\delta J}{\delta \theta_2}\right]^T, \frac{\delta J}{\delta \theta_1} = -e \cdot y_{empty}, \frac{\delta J}{\delta \theta_2} = -e.$$

The determination according to the invention of the loading of a soot filter with soot particles from an exhaust gas mass flow of an internal combustion engine in a motor vehicle is thus independent of the type of measuring signals used in each case for characterizing the loading behavior of the soot filter, and in particular may take place independently of an exhaust gas volumetric flow or exhaust gas mass flow. In addition, any further given influencing factors for the loading of the soot filter may be taken into account by appropriately correcting the measured values in a preceding computing step. The method according to the invention allows a reliable determination of the instantaneous degree of loading of a soot filter with soot particles from an exhaust gas mass flow of an internal combustion engine in a motor vehicle, based on any given reference model parameters and corresponding filter flow rate curves or characteristic curves.

Further preferred embodiments of the invention result from the other features set forth in the subclaims. Unless stated otherwise, the various embodiments described in the present patent application are advantageously combinable.

According to a first particularly preferred implementation form of the method according to the invention, the determination of the loading of the soot filter takes place by real-time parameter estimation, using the gradient method. Accordingly, the first estimated parameter $\theta_1=k$, i.e., the first process parameter, and the second estimated parameter $\theta_2=d$, i.e., the second process parameter, are determined by integration via the following expression, using the estimated error e:

$$\dot{k}=\gamma_k \cdot e \cdot y_{meas} \text{ and } \dot{d}=\gamma_d \cdot e$$

where $\dot{k}$: derivative of the first estimated parameter with respect to time, $\dot{d}$: derivative of the second estimated parameter with respect to time, $\gamma_k$: estimation speed of the first estimated parameter, and $\gamma_d$: estimation speed of the second estimated parameter.

With the gradient according to the parameters $\nabla J(\theta)$, one may now run in "ascending order" at speed $\Gamma$:

$$\dot{\theta}=-\Gamma \cdot \nabla J(\theta).$$

In the present case, this means $$\dot{\theta}=-\Gamma \cdot e \emptyset \text{ where } \theta=[\theta_1+\theta_2]^T, \emptyset=[y_{meas},1]^T.$$

$\Gamma$ is the "adaptive amplification," and is the estimation speed usually used with $$\Gamma = \begin{bmatrix} \gamma_1 & 0 \\ 0 & \gamma_2 \end{bmatrix}.$$

In discrete time, expansions are possible here, for example:

$$e_{new} = \frac{e}{\alpha \phi^T \phi}.$$

Further information concerning real-time parameter estimation according to the gradient method is available from P. A. Ioannou, B. Fidan: Adaptive Control Tutorial (Advances in Design and Control), Society for Industrial and Applied Mathematics, Philadelphia, 2006.

In a second particularly preferred implementation form of the method according to the invention, the estimation speeds of the first and second estimated parameters $\gamma_k$, $\gamma_d$ in the real-time parameter estimation vary corresponding to the measuring accuracy of the first and second exhaust gas mass flows and the first and second pressure drops $y_{empty}$, $y_{meas}$, where $\gamma_k=\gamma_d=0$ for low measuring accuracy, and $\gamma_k$, $\gamma_d \gg 0$ for high measuring accuracy are used in determining the loading of the soot filter. The estimation speed is therefore increased when the engine operation provides suitable measured values for an exhaust gas estimation, while in the converse case the estimation speed is reduced.

In another preferred implementation form of the method according to the invention, the first estimated parameter $\theta_1=k$ and the second estimated parameter $\theta_2=d$ are determined by real-time parameter estimation according to the least squares method. The sum of the estimated error e squared is hereby minimized. Particulars concerning real-time parameter estimation according to this method may be obtained from P. A. Ioannou, B. Fidan: Adaptive Control Tutorial (Advances in Design and Control), Society for Industrial and Applied Mathematics, Philadelphia, 2006.

In one very particularly preferred implementation form of the method, the first and second pressure drops $y_{empty}$, $y_{meas}$ are measured using a differential pressure sensor. The reliability of the estimated values that are obtainable with the method according to the invention may be increased by using a differential pressure sensor in determining the loading of the soot filter, since the measured values supplied by the differential pressure sensor may be directly used as overload protection for the soot filter. For this purpose, a plausibility check between the loading of the soot filter obtained according to the method and the data that are measured using the differential pressure sensor is carried out in the engine control unit. In particular, the use of a differential pressure sensor compared to a possible alternative of providing one pressure sensor each at the inlet and at the outlet of the soot filter results in a cost savings for the loading determination.

Furthermore, it is preferred for the measuring signals for the first and second pressure drops $y_{empty}$, $y_{meas}$, obtained using the differential pressure sensor with the soot filter empty and loaded, to undergo digital filtering for noise suppression for the further processing. Filtering of these measuring data is advantageous in particular to ensure a phase adjustment for the data obtained for loading of the soot filter. A continuous frequency filter, also known as a Butterworth filter, is preferably used for filtering measuring data for determining the loading of a soot filter. Digital filters, in particular fourth-order digital filters, and mean value filters are also suitable for this use.

Moreover, it is preferred to determine the first and second exhaust gas mass flows by ultrasonic measurement. Unlike the customary computation of the exhaust gas mass flows through the soot filter based on the fuel and air flow rate through the engine control unit, the mass flows measured by means of ultrasonic sensors are directly available for determining the loading of the soot filter. In this regard, by measuring the exhaust gas mass flows that act during the loading of the soot filter, it is possible to increase the reliability of the estimated values that are obtainable with the method according to the invention.

In a likewise preferred implementation form of the method according to the invention, the measuring signals for the first and second exhaust gas mass flows, obtained via the ultrasonic measurement, undergo digital filtering for noise suppression prior to further processing. In this regard, reference is made to the above statements concerning filtering of the measuring signals for the first and second pressure drops, obtained according to the method, which similarly apply for the filtering of the ultrasonic signals.

According to a last preferred implementation form of the method according to the invention, the loading of the soot filter with soot particles is determined continuously during operation of the internal combustion engine.

Alternatively, the determination of the loading of the soot filter takes place at predefined time intervals, the accuracy of the estimate increasing with the intensity of the exhaust gas mass flows that occur.

According to a further method alternative, the loading of the soot filter is determined as a function of situation recognition, in which instantaneous state data of the internal combustion engine are detected, and the measured or ascertained values are provided for determining the loading of the soot filter with soot particles during operation of the internal combustion engine. Particularly suitable state data for characterizing an operating situation of the internal combustion engine are the instantaneous engine load, i.e., the instantaneous fuel consumption, and the operating period of the engine, i.e., the distance traveled by the motor vehicle having the internal combustion engine. In addition to the fuel consumption and/or the operating period of the engine, i.e., the distance traveled by the motor vehicle, for the situation recognition basically any other parameters that are relevant for soot formation during operation of the internal combustion engine may be detected and used for estimating the loading of the particulate filter. The reliability of the estimated values that are obtainable with the method according to the invention may be further increased by taking into account in a targeted manner various operating modes of the internal combustion engine during the loading of the soot filter. Such situation recognition is made possible by an appropriate control program in the engine control unit.

A further aspect of the invention relates to a control device for an internal combustion engine, having a soot filter in a motor vehicle, that is designed for determining loading of the soot filter with soot particles from an exhaust gas mass flow of the internal combustion engine, in particular a gasoline engine, according to the method according to the invention as described above.

Lastly, a further aspect of the invention relates to a computer program product that includes commands which, when executed by a computer, prompt the computer to carry out a method according to the invention as described above. Yet another aspect of the invention relates to a computer-readable memory medium, comprising a computer program product that includes commands which, when executed by a computer, prompt the computer to carry out a method according to the invention as described above. The memory medium may be a volatile memory or a nonvolatile memory.

BRIEF DESCRIPTION OF THE DRAWINGS

The invention is explained in greater detail below in one exemplary embodiment, with reference to the associated drawings, which show the following.

DETAILED DESCRIPTION OF THE INVENTION

Figure 1:
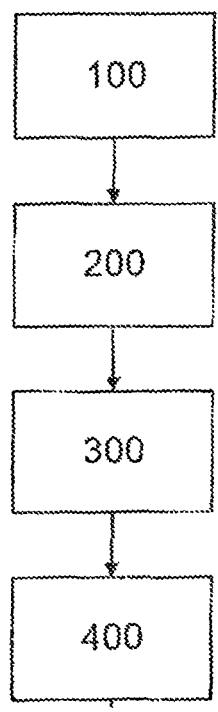
FIG. 1 shows a schematic flow chart of a method according to the invention.

FIG. 1 shows a schematic flow chart of the method according to the invention. The illustrated method steps for determining loading of a soot filter with soot particles from an exhaust gas mass flow of an internal combustion engine are explained in greater detail below, with reference to the estimated result for the loading according to the method, shown in FIG. 2. In the example according to FIG. 2, a determination of the loading of a soot filter in a motor vehicle takes place with a gasoline engine during driving operation after a cold start of the engine, over a period of 120 seconds.

To this end, in a first method step 100 a brand-new soot filter having the same design is connected to a gasoline engine on a test stand, so that the exhaust gas mass flow of the engine can flow through the soot filter corresponding to its use in the motor vehicle. In addition, a differential pressure sensor is installed between the inlet and the outlet of the soot filter in order to measure a pressure difference $y_{empty}$ between the filter inlet and the filter outlet. The soot filter as well as the differential pressure sensor are of the same type as used in the motor vehicle for the driving operation.

The gasoline engine is then operated in each case for several minutes with progressively increasing load, and thus, increasing exhaust gas mass flow, until the entire flow range within which the exhaust gas mass flow through the soot filter can fluctuate during actual driving operation is covered.

For each operating state of the engine that is thus run through, the pressure drop across the empty soot filter, the exhaust gas temperature, and the ambient pressure are measured within the holding period. With these measured values, the associated exhaust gas mass flows are then computed in the manner stated above and provided in the form of a characteristic curve for the empty soot filter for use in the subsequent method steps.

Figure 2:
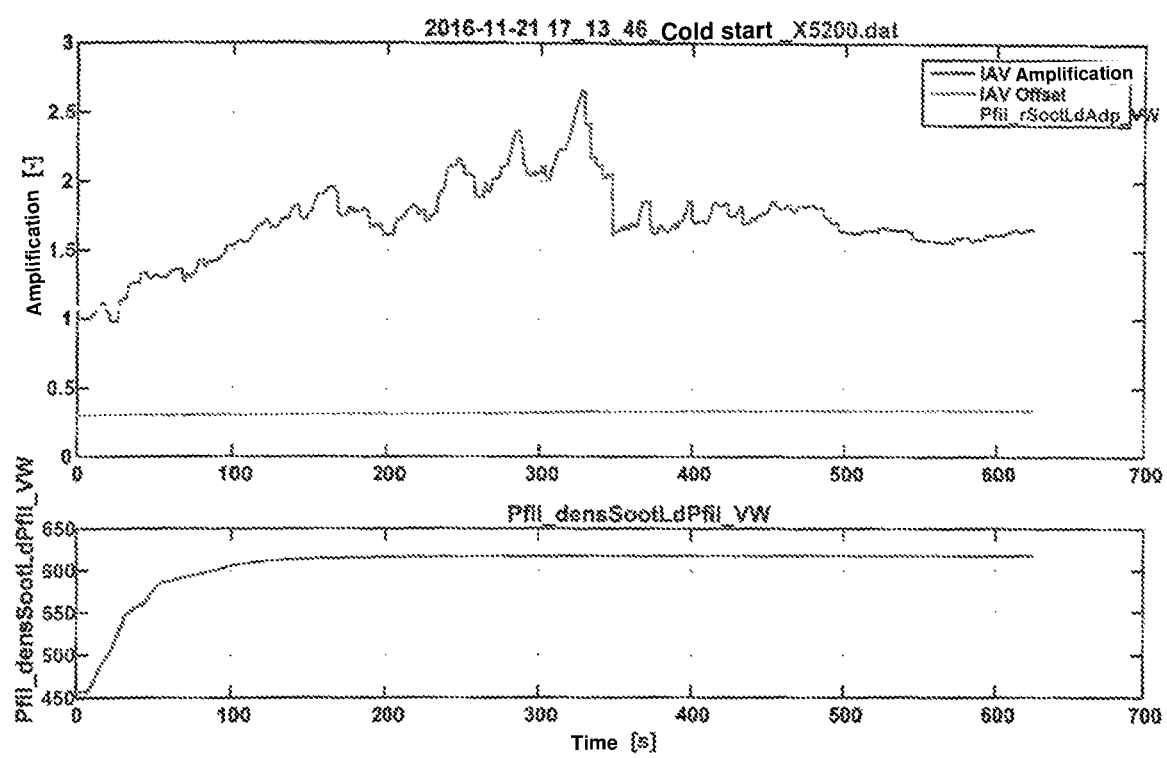
FIG. 2 shows a graphical illustration of an estimated loading of the soot filter with soot particles over time, with the associated measured and estimated amplification of the pressure drop across the soot filter.

For the soot filter and the differential pressure sensor, each with the same respective designs, in the motor vehicle having a gasoline engine, during driving operation corresponding to FIG. 2 the differential pressure $y_{meas}$ between the filter inlet and the filter outlet is then continuously measured and detected in each case in a second step 200, once again with the exhaust gas temperature and the ambient pressure in each case being detected at the same time. All measurements are carried out using an anti-aliasing filter (possibly analogous to an RC element, for example), and possibly a digital filter for noise suppression.

In a third step 300, based on the characteristic curve that is determined for the empty soot filter in the first method step, the first pressure drop $y_{empty}$ is selected that was measured for the same values for the exhaust gas temperature and the ambient pressure; in the event of a deviation from the exhaust gas temperature and/or the ambient pressure during the measurement of the first pressure drop $y_{empty}$ and of the second pressure drop $y_{meas}$, the first pressure drop $y_{empty}$ is corrected by computer with the values for the exhaust gas temperature and/or the ambient pressure that were measured during driving operation. This ensures that a deviation of the exhaust gas mass flows through the soot filter, with and without loading, is based essentially on a loading with soot particles.

Lastly, in a fourth step 400 the two filtered values for the first and second pressure drop $y_{empty}$, $y_{meas}$ determined in the third method step are used to compute the instantaneous loading of the soot filter at constant estimation speeds $\gamma_k$, $\gamma_d$. Based on the assumption that a loading of the soot filter with soot particles results in a measured value that is higher by an amplification factor k than with a corresponding empty filter, and the amplification resulting from the sensor offset d, the parameters k and d to be estimated are computed according to the gradient method as stated above, using the real-time parameter estimation according to the invention.

The measured values thus obtained for the amplification 31 and the sensor offset 32 as well as the amplification 33 obtained by real-time parameter estimation are illustrated in the top portion of FIG. 2, in each case over the entire measuring period. The bottom portion of FIG. 2 shows the estimated loading of the soot filter with soot particles during driving operation over the measuring period, according to the method according to the invention, using the estimated amplification 33.

LIST OF REFERENCE NUMERALS 1 loading measurement protocol
2 loading (Pfil densSootLd-Pfil_VW)
21 estimated loading
3 amplification
31 measured amplification (IAV amplification)
32 sensor offset (IAV offset)
33 estimated amplification (Pfil_rSootLdAdp_VW)
4 time axis
100 first method step
200 second method step
300 third method step
400 fourth method step

The invention claimed is:

1. A method for determining a loading of a soot filter with soot particles from an exhaust gas mass flow of an internal combustion engine, in particular a gasoline engine, in a motor vehicle, comprising the steps:
determining a characteristic curve for the relationship between the exhaust gas mass flow, exhaust gas temperature, ambient pressure, and pressure drop across the soot filter without loading, wherein a plurality of different first exhaust gas mass flows of an internal combustion engine are led through a soot filter without loading, and for each first exhaust gas mass flow a first pressure drop ($y_{empty}$) that occurs is measured by means of at least one sensor while simultaneously detecting a first exhaust gas temperature and a first ambient pressure, and wherein the first pressure drops are provided, normalized by computer with regard to the first exhaust gas temperature and the first ambient pressure, in a form of a characteristic curve of the soot filter without loading;
determining a second exhaust gas mass flow of the internal combustion engine that is led through the soot filter, with loading, during operation of the internal combustion engine, and measuring a second pressure drop ($y_{meas}$) that occurs, by means of the at least one sensor while simultaneously detecting a second exhaust gas temperature and a second ambient pressure;
selecting a first pressure drop ($y_{empty}$) from the characteristic curve of the soot filter, without loading, for which the first and second exhaust gas mass flows have the same value, the first and second exhaust gas temperatures have the same value, and the first and second ambient pressures have the same value;
computing an estimated value ($y_{estimated}$) for the loaded soot filter via a real-time parameter estimation according to a reference model $$y_{estimated}(\theta) = y_{empty} \cdot \theta_1 + \theta_2 = y_{empty} \cdot k + d$$

where $\theta$: estimated parameter, $\theta_1 = k$: estimated amplification due to loading of the soot filter, $\theta_2 = d$: estimated deviation of the at least one sensor in determining the pressure drop across the soot filter,
wherein in a first step an error (e) between the second pressure drop ($y_{meas}$), measured for the soot filter with loading, and the estimated value ($y_{estimated}$) to be determined is computed:

$$e = y_{estimated}(\theta) - y_{meas} = (k \cdot y_{empty} + d) - y_{meas}$$

where $\theta_2 = =1$ for the soot filter without loading, and
wherein in a second step the first estimated parameter ($\theta_1 = k$) and the second estimated parameter ($\theta_2 = d$) are determined by real-time parameter estimation.

2. The method according to claim 1, wherein the first estimated parameter ($\theta_1 = k$) and the second estimated parameter ($\theta_2 = d$) are determined by real-time parameter estimation according to the gradient method, wherein the estimated error (e) is used to determine the first and second estimated parameters ($\theta_1 = k$, $\theta_2 = d$) by integration according to $$\dot{k} = \gamma_k \cdot e \cdot y_{meas} \text{ and } \dot{d} = \gamma_d \cdot e$$

where $\dot{k}$: derivative of the first estimated parameter with respect to time, $\dot{d}$: derivative of the second estimated parameter with respect to time, $\gamma_k$: estimation speed of the first estimated parameter, and $\gamma_d$: estimation speed of the second estimated parameter.

3. The method according to claim 2, wherein the estimation speeds of the first and second estimated parameters ($\gamma_k$, $\gamma_d$) in the real-time parameter estimation are varied correspondingly to the measuring accuracy of the first and second exhaust gas mass flows and the first and second pressure drops ($y_{empty}$, $y_{meas}$), where $$\gamma_k = \gamma_d = 0$$

for low measuring accuracy, and $$\gamma_k, \gamma_d \gg 0$$

for high measuring accuracy, are used in determining the loading of the soot filter.

4. The method according to claim 1, wherein the first estimated parameter ($\theta_1 - k$) and the second estimated parameter ($\theta_1 - d$) are determined by real-time parameter estimation according to the least squares method, wherein the sum of the estimated error (e) squared is minimized.

5. The method according to claim 1, wherein the first and second pressure drops ($y_{empty}$, $y_{meas}$) are measured with a differential pressure sensor.

6. The method according to claim 5, wherein the measuring signals for the first and second pressure drops ($y_{empty}$, $y_{meas}$) obtained with the differential pressure sensor undergo digital filtering for noise suppression prior to further processing, in particular using a Butterworth filter.

7. The method according to claim 1, wherein the first and second exhaust gas mass flows are determined by ultrasonic measurement.

8. The method according to claim 7, wherein the measuring signals for the first and second exhaust gas mass flows, obtained via the ultrasonic measurement, undergo digital filtering for noise suppression prior to further processing.

9. The method according to claim 1, wherein the determination of the loading of the soot filter with soot particles during operation of the internal combustion engine takes place continuously, at predefined time intervals, or as a function of situation recognition, in particular of a fuel consumption and/or a distance traveled, with provision of the measured second pressure drop ($y_{meas}$) and determined first pressure drop ($y_{empty}$) for further use.

10. A control device for an internal combustion engine, in particular a gasoline engine, having a soot filter, characterized in that the control device is designed for carrying out the method according to claim 1.

11. A computer program product, comprising a program with instructions which, when executed by a computer, prompt the computer to carry out the method according to claim 1.

* * * * *